(12) United States Patent
Ware et al.

(10) Patent No.: US 12,066,957 B2
(45) Date of Patent: *Aug. 20, 2024

(54) INTERFACE FOR MEMORY READOUT FROM A MEMORY COMPONENT IN THE EVENT OF FAULT

(71) Applicant: Rambus Inc., San Jose, CA (US)

(72) Inventors: Frederick A. Ware, Los Altos Hills, CA (US); Kenneth L. Wright, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,355

(22) Filed: Apr. 3, 2023

(65) Prior Publication Data
US 2024/0004813 A1    Jan. 4, 2024

Related U.S. Application Data

(63) Continuation of application No. 17/715,379, filed on Apr. 7, 2022, now Pat. No. 11,625,346, which is a continuation of application No. 16/548,714, filed on Aug. 22, 2019, now Pat. No. 11,308,009, which is a continuation of application No. 15/284,307, filed on Oct. 3, 2016, now Pat. No. 10,409,742.

(Continued)

(51) Int. Cl.
G06F 11/00    (2006.01)
G06F 11/07    (2006.01)
G06F 11/10    (2006.01)
G06F 11/16    (2006.01)
G06F 11/20    (2006.01)
G06F 13/16    (2006.01)
G06F 13/40    (2006.01)

(52) U.S. Cl.
CPC ........ G06F 13/1684 (2013.01); G06F 11/073 (2013.01); G06F 11/0751 (2013.01); G06F 11/0772 (2013.01); G06F 11/0784 (2013.01); G06F 11/079 (2013.01); G06F 11/1044 (2013.01); G06F 11/1048 (2013.01); G06F 11/1658 (2013.01); G06F 11/2007 (2013.01); G06F 13/4027 (2013.01); Y02D 10/00 (2018.01)

(58) Field of Classification Search
CPC ............. G06F 11/0778; G06F 11/1048; G06F 11/1044; G06F 11/1658; G06F 11/1684; G06F 11/0784; G06F 11/0787; G06F 11/2007; G06F 11/2002; G06F 11/201
See application file for complete search history.

(56) References Cited

U.S. PATENT DOCUMENTS 5,459,851 A    10/1995    Nakajima et al.
5,680,365 A    10/1997    Blankenship
(Continued)

Primary Examiner — Marc Duncan
(74) Attorney, Agent, or Firm — Lance Kreisman; Peninsula Patent Group

(57) ABSTRACT

Memory controllers, devices, modules, systems and associated methods are disclosed. In one embodiment, an integrated circuit (IC) memory component is disclosed that includes a memory core, a primary interface, and a secondary interface. The primary interface includes data input/output (I/O) circuitry and control/address (C/A) input circuitry, and accesses the memory core during a normal mode of operation. The secondary interface accesses the memory core during a fault mode of operation.

20 Claims, 5 Drawing Sheets

Related U.S. Application Data

(60) Provisional application No. 62/238,403, filed on Oct. 7, 2015.

(56) References Cited

U.S. PATENT DOCUMENTS

| | | | |
|---|---|---|---|
| 5,799,200 | A | 8/1998 | Brant et al. |
| 5,923,593 | A | 7/1999 | Hsu et al. |
| 6,154,851 | A | 11/2000 | Sher et al. |
| 7,580,465 | B2 | 8/2009 | Zimmerman et al. |
| 7,640,409 | B1 | 12/2009 | Stafford et al. |
| 7,688,663 | B2 | 3/2010 | Chu et al. |
| 7,984,329 | B2 | 7/2011 | Lastras-Montano et al. |
| 8,023,347 | B2 | 9/2011 | Chu et al. |
| 8,041,989 | B2 | 10/2011 | Lastras-Montano et al. |
| 8,055,936 | B2 | 11/2011 | Moh et al. |
| 8,122,291 | B2 | 2/2012 | Patel et al. |
| 8,811,065 | B2 | 8/2014 | Rajan et al. |
| 8,873,320 | B2 | 10/2014 | Goel et al. |
| 10,409,742 | B2 * | 9/2019 | Ware .................... G06F 11/0784 |
| 11,308,009 | B2 * | 4/2022 | Ware ...................... G06F 11/079 |
| 11,625,346 | B2 * | 4/2023 | Ware ................... G06F 11/0772 710/308 |
| 2005/0108459 | A1 | 5/2005 | Pochmuller |
| 2006/0020740 | A1 | 1/2006 | Bartley et al. |
| 2008/0155149 | A1 | 6/2008 | de Araujo et al. |
| 2009/0183039 | A1 | 7/2009 | Borkenhagen et al. |
| 2011/0060937 | A1 | 3/2011 | Schuetz |
| 2013/0176763 | A1 | 7/2013 | Ware et al. |
| 2014/0181574 | A1 | 6/2014 | Resnick |
| 2014/0192601 | A1 | 7/2014 | Do |
| 2015/0332736 | A1 | 11/2015 | Bringivijayaraghavan et al. |

\* cited by examiner

INTERFACE FOR MEMORY READOUT FROM A MEMORY COMPONENT IN THE EVENT OF FAULT

CROSS-REFERENCE TO RELATED APPLICATIONS

This application is a Continuation that claims priority to U.S. Ser. No. 17/715,379, filed Apr. 7, 2022, entitled INTERFACE FOR MEMORY READOUT FROM A MEMORY COMPONENT IN THE EVENT OF FAULT, which is a Continuation that claims priority to U.S. Ser. No. 16/548,714, filed Aug. 22, 2019, entitled INTERFACE FOR MEMORY READOUT FROM A MEMORY COMPONENT IN THE EVENT OF FAULT, now U.S. Pat. No. 11,625,346, which is a Continuation that claims priority to U.S. Ser. No. 15/284,307, filed Oct. 3, 2016, entitled INTERFACE FOR MEMORY READOUT FROM A MEMORY COMPONENT IN THE EVENT OF FAULT, now U.S. Pat. No. 10,409,742, which is a Non-Provisional that claims priority to U.S. Provisional Application No. 62/238,403, filed Oct. 7, 2015, entitled INTERFACE FOR MEMORY READOUT FROM A MEMORY COMPONENT IN THE EVENT OF FAULT, all of which are incorporated herein by reference in their entirety.

TECHNICAL FIELD

The disclosure herein relates to memory modules, memory controllers, memory components, and associated methods.

BACKGROUND

Memory systems may employ error coding schemes for improved reliability. For server applications, aggressive error detection/correction coding (EDC) methods, such as Single Device Data Correction (SDDC) or coding known by one form under the IBM trademark Chipkill, provide error correction capability in the event of a fault with the module associated with a memory component. One example of the Chipkill process generally involves two memory modules operating in lockstep, with the databus width (such as 144 bits) of both modules being EDC coded. Should a memory component on one of the modules become associated with a detected fault, the coding enables a reconstruction of the data associated with the failed component without the entire memory system having to go offline.

While SDDC codes like Chipkill coding often work well for their intended applications, memory modules often include many memory components. Operating two modules in lockstep generally involves activating all of the memory devices on both modules for each memory transaction. Significant power is thus consumed for each transaction. It would be desirable to have the flexibility to carry out memory transactions using less than all of the available memory components while still retaining error coding capabilities to address a majority of fault scenarios.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Memory modules, memory controllers, devices and associated methods are disclosed. In one embodiment, an integrated circuit (IC) memory component is disclosed that includes a memory core, a primary interface and a secondary interface. During a normal operation mode, the primary interface carries out data and command/address functions in accessing the memory core. During a fault mode of operation, the secondary interface takes control of the data and command/address functions to offload data from the memory core. This allows for extraction of the data from the memory component in the event of a detected failure, such as one associated with the primary interface, that allows for retrieving the data and thereby preventing an off-line condition. Having the ability to retrieve the data via the secondary interface also allows for use of a single memory module while still providing EDC fault coverage for a majority of potential failure conditions.

Figure 1:
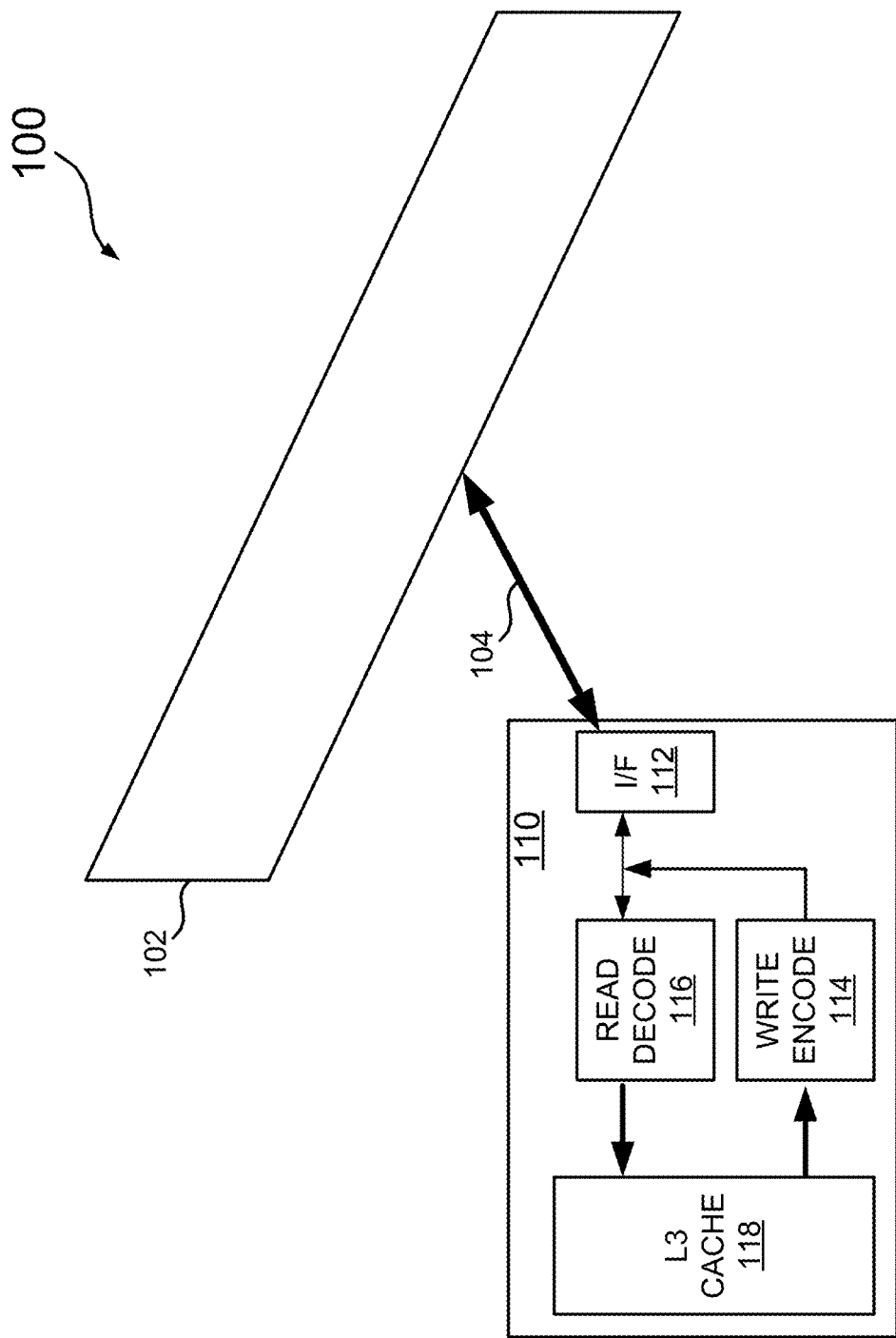
FIG. 1 illustrates one embodiment of a memory system that employs a memory controller, and a memory module.

Referring to FIG. 1, one embodiment of a memory system, generally designated 100, employs a memory module 102 coupled to memory control circuitry 110 via a signaling link 104. The module 102 may be a dynamic random access memory (DRAM) module or a non-volatile memory module. The architecture described herein renders it possible to retrieve data from a faulty memory component to improve system reliability and flexibility while reducing power consumption.

With continued reference to FIG. 1, one specific embodiment of the memory control circuitry 110 may include, e.g., a discrete memory controller separate from a requestor integrated circuit (IC), or any IC that controls memory devices, such as DRAM and nonvolatile memory devices, and could be any type of system-on-chip (SoC). One embodiment of the memory control circuitry 110 employs an interface 112 to transmit and receive signals to and from the memory module 102. Write data signals that are transmitted by the interface may be protected via error detection correction (EDC) bits that are coded/decoded by a write error detection correction (EDC) encoder 114. The write EDC encoder 114 generates error information, such as EDC parity bits, associated with write data symbols. The error encoding may be generated in accordance with one of many acceptable EDC algorithms including, for example, straightforward single-bit Hamming codes, to more sophisticated high-speed BCH (Bose, Ray-Chaudhuri and Hocquenghem) codes. Other EDC codes, such as Reed-Solomon codes, turbo codes, cyclic redundancy codes (CRC) and low density parity check (LDPC) codes may also be acceptable. The memory control circuitry 110 includes a read EDC decoder 116 to decode error information associated with incoming read data symbols from the memory module 102. A level 3 cache 118 interfaces the memory control circuitry to a host processing resource (not shown).

Figure 2:
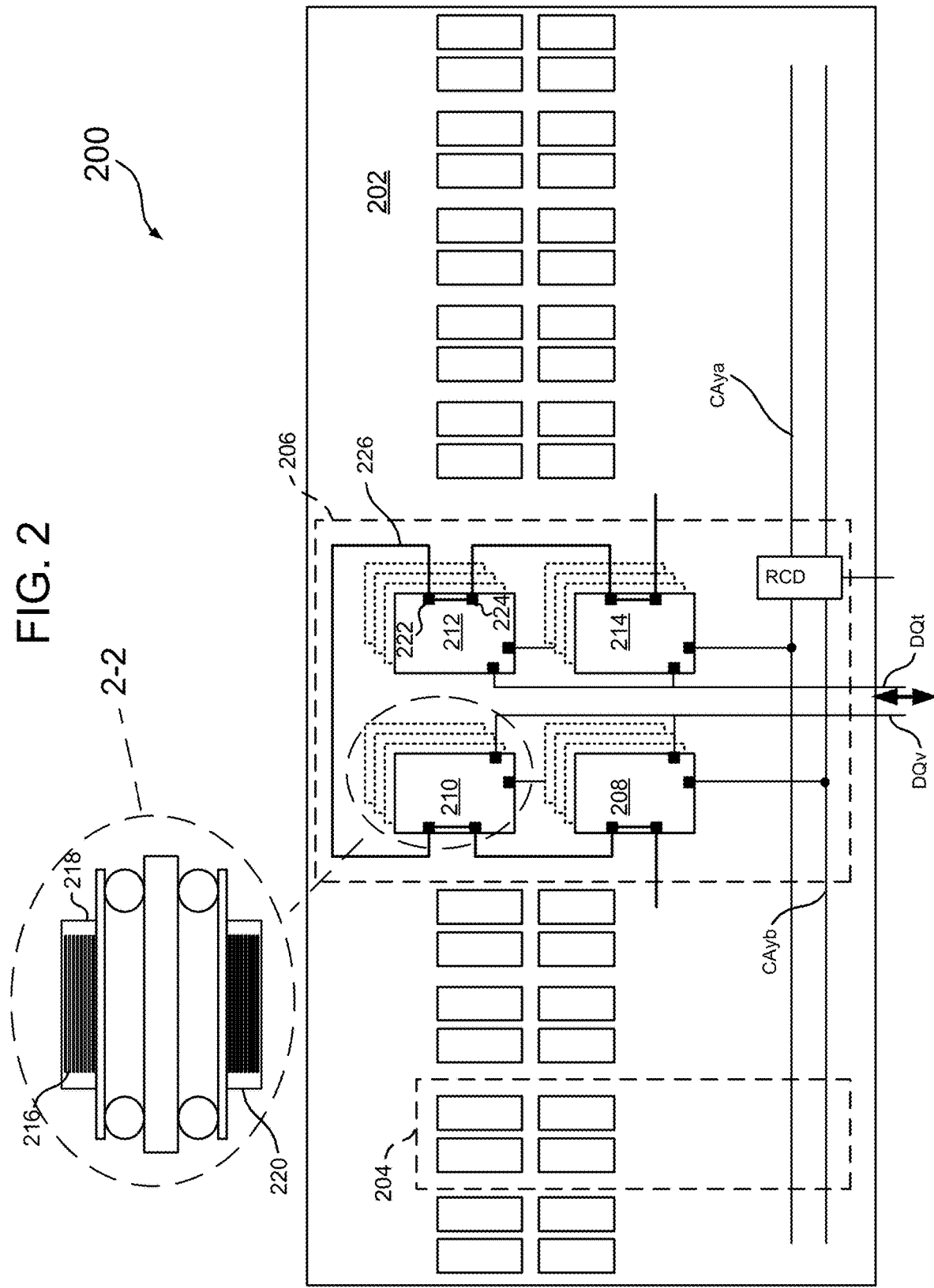
FIG. 2 illustrates one embodiment of the memory module shown in FIG. 1.

FIG. 2 illustrates one specific embodiment of a DRAM memory module, generally designated 200, that is suitable for the memory system of FIG. 1, such that it has the ability to retrieve data from a faulty DRAM component for subsequent error evaluation. The DRAM memory module 200 may be of the Registered Dual Inline Memory Module (RDMM) type, and includes a substrate 202 that mounts multiple groups of components, such as at 204 (in phantom). A more detailed view of one of the groups of components is shown at 206, with the understanding that each group employs the same structure. With this in mind, each group interfaces with the memory control circuitry 110 (FIG. 1) via primary DQ nibble groups, such as DQv and DQt. For one embodiment, each data nibble group includes four data DQ links and a differential strobe DQS link (not shown). All of the links generally run from associated groups of components to a primary databus connector (not shown) on the module.

Further referring to FIG. 2, for one specific example, each group of devices includes four stacks of DRAM memory die 208, 210, 212 and 214. Each stack may contain multiple DRAM memory components. One example of a stacked set of devices is shown in the magnified view 2-2, illustrating stacked components 216 within a single package 218. For some configurations, the opposite side of the module substrate 202 may mount memory components, such as at 220. The interface of each DRAM memory component may be connected in parallel using through-silicon-vias, or any other connection method. Other stacking configurations are also possible.

With continued reference to FIG. 2, for one embodiment, a given pair of stacks of DRAM devices, such as 208 and 210, may have primary data interface (DQ) connections interconnected in a multi-drop configuration, such that both DRAM stacks 208 and 210 interface with the DQv nibble. The second pair of stacks 212 and 214 couple to a second primary data interface nibble DQt in a multi-drop configuration. For one embodiment, additional links (not shown) are provided on the module, along with one or more additional spare memory components (not shown) to provide for on-module device repair. Having the spare devices on the module may prevent the entire module from having to be replaced due to a component failure. The methods described may use the additional spare storage to provide a high level of fault coverage with fewer active components per memory transaction.

With continued reference to FIG. 2, the DRAM memory module 200 includes a control/address (CA) buffer component RCD that drives intermediate CA links CAya and CAyb connecting to the pairs of DRAM memory stacks. For this configuration, a given pair of DRAM stacks, such as at 208 and 210, may be accessed by CA link CAyb, independently of the pair of stacks at 212 and 214 (which may be accessed via link CAya).

Further referring to FIG. 2, the DRAM components 216 each include a secondary interface that includes an input interface port, such as at 222, and an output interface port, such as at 224. For one example, the input interface port is a serial interface port, and the output interface port is a serial port. Further details regarding the serial interface are described below with respect to FIG. 3. The serial interface ports of each memory component connect to a serial bus 226 in a daisy-chained configuration. The serial bus extends across all of the memory groups 204. This allows any memory component in the module to be accessed by the secondary interface for data retrieval and/or spare storage.

Figure 3:
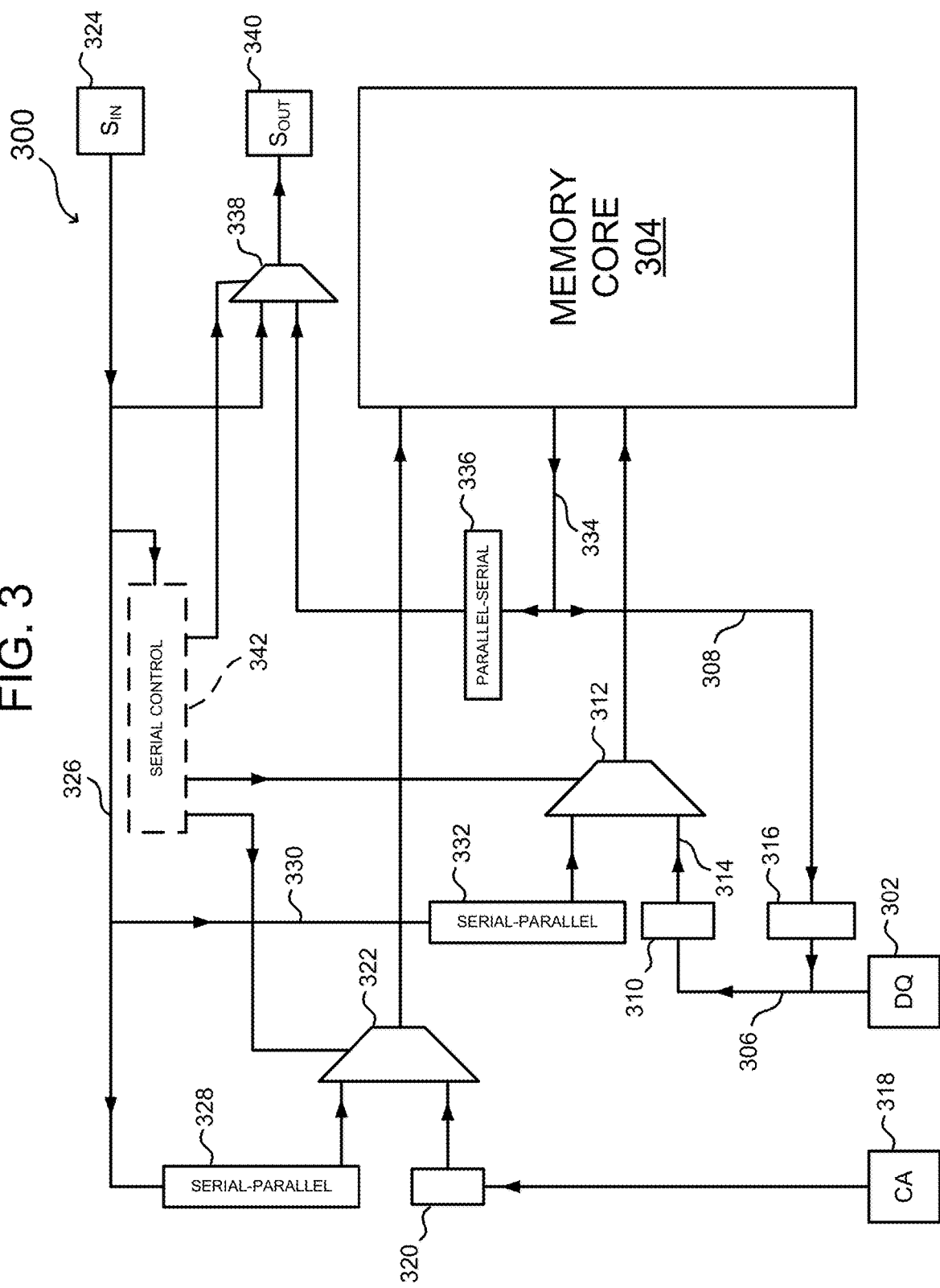
FIG. 3 illustrates one embodiment of the primary and secondary interfaces employed in each memory device of FIG. 2.

FIG. 3 illustrates further detail for one embodiment of the memory core and primary/secondary interface circuitry for each memory component. The primary interface includes primary data input/output (I/O) circuitry DQ 302 that accesses a memory core 304 via a write data path 306 and a read data path 308. A write transfer interface 310 feeds write data to write data multiplexer circuitry 312 along input paths 314. The output of the write data multiplexer circuitry 312 couples to the memory core 304. The read data path 308 includes a read data transfer interface 316 that receives read data from the memory core 304. The primary interface also includes primary command/address (C/A) input circuitry CA 318 that provides command, address and control signals to the memory core 304. Signals received at the C/A input circuitry 318 are fed through a C/A transfer interface 320 to an input of C/A multiplexer circuitry 322, which selectively forwards the signals to the memory core 304.

Further referring to FIG. 3, the secondary interface includes a serial input port Sin 324 that includes serial I/O circuitry to receive serialized signals from to a serial bus (not shown). For one embodiment, the serial bus is two lanes wide to provide sufficient bandwidth for transferring the entire contents of a memory component within a reasonable time interval. Other embodiments may employ a single lane or multi-lanes of varying widths, depending on the application. The serial input signals may include data, command, control and address signals sufficient to carry out a memory transaction between memory components. The serial I/O circuitry 324 passes C/A signals along serial path 326 to a serial-to-parallel converter 328, which feeds parallel C/A signals to the inputs of the C/A multiplexer circuitry 322. Write data is fed by the serial I/O circuitry 324 along serial write path 330, and converted into parallel format by serial-to-parallel converter 332. The parallel write data is then fed to the write data multiplexer 312. For read operations, read data may be retrieved from the memory core 304 along parallel data paths 334, then converted to serial form by parallel-to-serial converter 336, and directed to a serial output multiplexer 338, which transfers its output to a serial output port Sout 340.

With continued reference to FIG. 3, in some instances, the serialized signals received by the serial input port Sin 324 merely pass from the serial input port directly to the serial output port Sout 340. This is handled via an appropriate control signal applied to the serial output multiplexer 338. For one embodiment, the multiplexers 312, 322 and 338 are controlled by a serial control circuit 342 that resides on the memory component, and may reside in the CA buffer component RCD. Controlling the multiplexers essentially enables one of the primary or secondary interface to the exclusion of the other. Thus, when the secondary interface is enabled (via the appropriate multiplexer control signals), the primary interface is disabled. Alternatively, the memory controller 110 may provide the control functionality for enabling/disabling the primary versus secondary interface.

As noted above, various aspects of the circuitry described herein enable data retrieval from a memory component associated with a detected fault condition on a memory module. This may improve system reliability and flexibility while reducing power consumption. To support the inclusion of a secondary interface in the memory components for the system and modules described above, the memory system generally operates in accordance with the steps shown in FIG. 4.

For one embodiment, the memory system operates in accordance with a dynamic random access memory (DRAM) protocol, where memory components disposed on a memory module are controlled by a memory controller. Data stored in the memory components mounted on the module may be error coded to allow for detection and correction of a certain number of bit errors, as appropriate for the application. The method described below allows for use of an EDC code that may correct fewer errors than that of a Chipkill code, but still provide significant error fault coverage with potentially half the power consumption due to a reduction in the number of memory devices activated per memory transaction.

Figure 4:
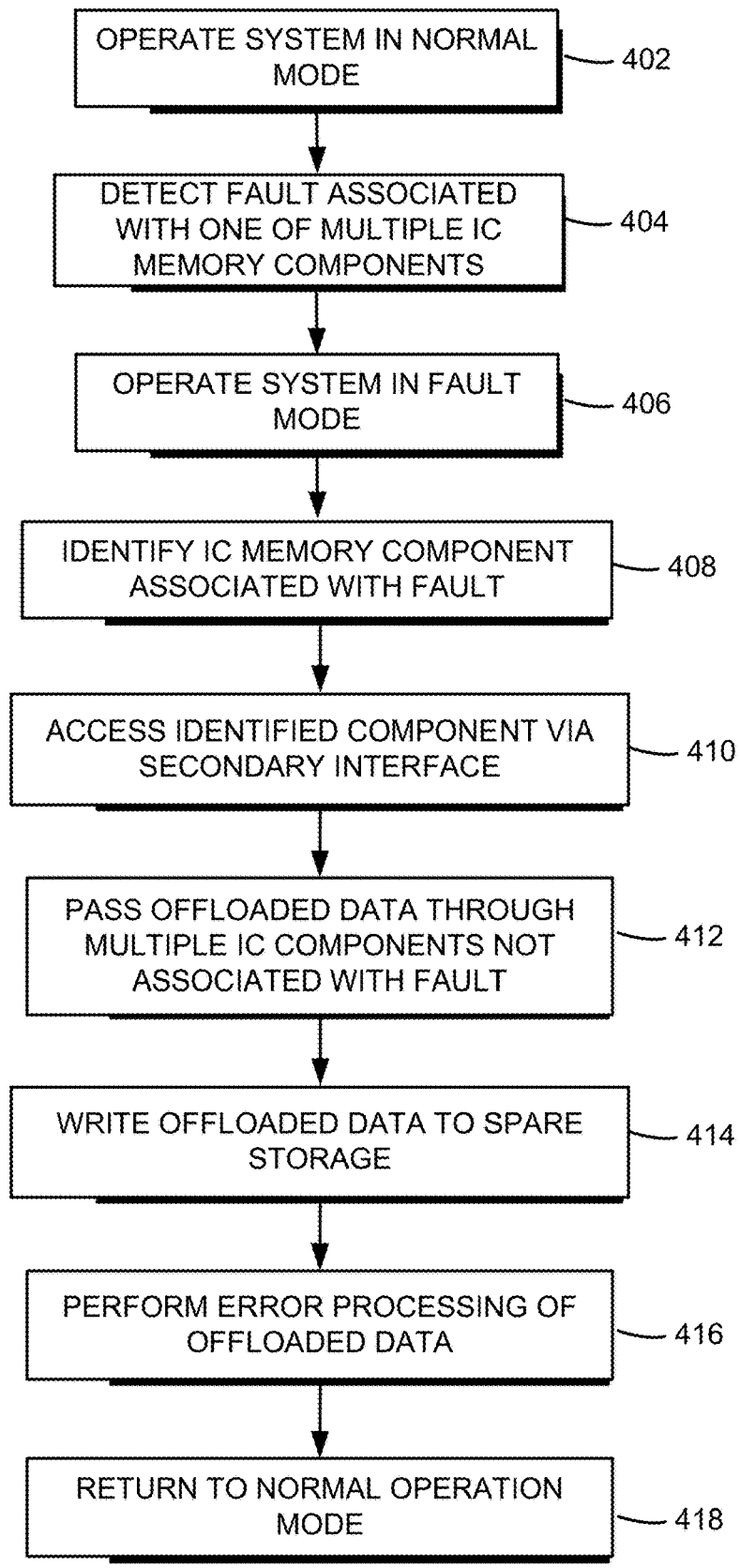
FIG. 4 shows a flow diagram of one embodiment of a method of operation in a memory module.

Referring to FIG. 4, memory transactions between the memory controller and the memory module are carried out primarily in a normal mode of operation, at 402. The normal mode of operation generally involves enabling the primary interface circuitry for each memory component to control accesses to the memory core, while disabling the secondary interface. The normal mode of operation continues until a fault associated with a memory component is detected, at 404, and the system enters a fault mode of operation, at 406.

In many fault circumstances, an interface connection, such as one or more conductors in the primary data interface or the primary CA interface, associated with a given memory component may cause the detected fault, by exhibiting an "open" connection or short circuit between conductors. The fault in the interface may impact the associated memory component such that transactions along the primary interface are unreliable or incapable of occurring. Thus, although data stored in the memory component may be inaccessible via the primary interface, the data may not be "faulty" at all.

For one embodiment, the fault mode of operation involves disabling the primary interface circuitry in one or more (or all) memory components, and enabling the secondary interface circuitry. Thus, during the fault mode, the secondary interface carries out the data, command, control and address functionality for the memory components to the exclusion of the primary interface. The memory component associated with the fault is then identified, at 408. That is, in one embodiment, during the fault mode, the functionality of the primary interface is decommissioned and reassigned to the secondary interface.

Further referring to FIG. 4, with the secondary interface enabled for each memory device, a read command is propagated along the daisy-chained serial bus, through the serial input port and out the serial output port of each memory component until the identified component receives the read command. The identified components' memory core is then accessed, at 410, and the stored data streamed out in serial fashion. The data stream is passed to the serial bus, and passed through one or more "downstream" memory components not associated with the detected fault, at 412. The data is eventually offloaded and stored to spare storage, at 414.

With continued reference to FIG. 4, the spare storage may be in the form of one or more additional memory components mounted on the module as one or more spare memory components, or may form spare storage disposed on or off the module. For applications where the memory module comprises a Load Reduced Dual Inline memory Module (LR-DIMM), the spare storage may be in the form of static random access memory (SRAM) or non-volatile memory formed on a buffer component. The offloaded data, once written to the spare storage, may then go through an error coding process, at 416, to "clean" the data as necessary. A memory mapping may be programmed for further transactions directed to the faulty memory device such that the new storage address may be utilized for subsequent operations. Once the offloading and mapping is complete, the memory system may return to the normal mode of operation, at 418.

The process described above may be successfully carried out without requiring the memory system to go offline, and may only take several seconds to complete. This may be beneficial for server applications that demand high reliability and minimal system stand-down time. Moreover, with the data retrieved, and spare storage employed, a repair to the module may be accomplished with similar fault coverage to that of a Chipkill algorithm, but utilizing only one module and significantly fewer memory components per memory transaction. The apparatus and methods described herein may also apply to systems having a plurality of memory modules.

Figure 5:
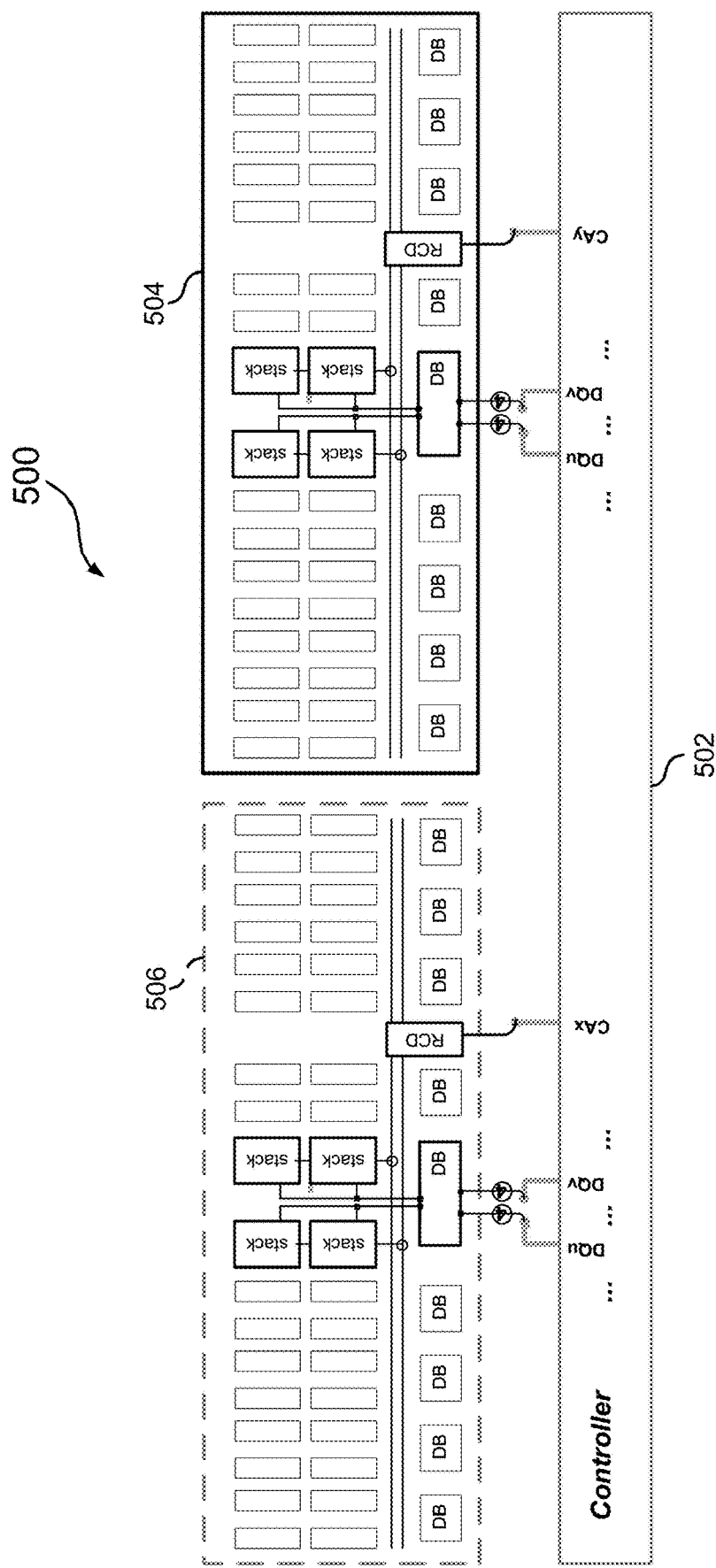
FIG. 5 illustrates a further embodiment of a system employing multiple memory modules.

FIG. 5 illustrates an alternative embodiment of a memory system, generally designated 500, that provides flexibility by supporting a legacy Chipkill form of EDC fault coverage in one mode of operation, and/or supporting the data offload form of fault coverage described above for another mode of operation. The memory system 500 employs a memory controller 502 that is capable of interfacing with a first memory module 504 in a first single-module operation mode, consistent with the module and system described above, and optionally with a second memory module 506 (in phantom) that may operate in lockstep with the first memory module 504 in a second operation mode. The memory modules may be of an RDIMM configuration, such as those described above, or of an LRDIMM configuration (shown in FIG. 5), including data buffer circuitry DB to buffer data signal lines between the memory components and the memory controller. During the second operation mode, the modules together may provide a form of Chipkill EDC fault coverage.

The system embodiment of FIG. 5 enables "ratcheting" of fault coverage options for a user by providing the flexibility to utilize a full Chipkill algorithm to provide coverage for most errors, or a single module mode to provide coverage for most of the errors correctable by Chipkill, but with possibly half the power consumption. Moreover, in rare circumstances, a given error may occur that cannot be isolated to a particular device. In such a scenario, by using memory components that employ the above-described secondary interfaces, data may be read out of one or more devices to provide a way to isolate errors to a narrower number of devices than the full two-module complement of devices. This may prevent a multi-component replacement of both modules, thus significantly reducing off-line conditions for the memory system and the associated repair costs.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., ' < signal name >') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A memory device, comprising:
   memory core circuitry to store data;
   a primary interface circuit including a data interface for coupling to multiple data paths and a command/address (C/A) interface for coupling to a command/address path, the primary interface to provide access to the data stored in the memory core circuitry during a normal mode of operation; and
   a secondary interface that is independent from the primary interface, the secondary interface to selectively provide access to the data stored in the memory core circuitry during a fault mode of operation.

2. The memory device of claim 1, wherein:
   the secondary interface includes a serial interface for coupling to a serial bus.

3. The memory device of claim 2, wherein:
   the serial interface includes a serial port for coupling to at least one other memory device.

4. The memory device of claim 2, wherein the serial interface further comprises:
   an input serial port; and
   an output serial port.

5. The memory device of claim 4, wherein:
   the input serial port receives an access request to access a portion of the data in the memory core circuitry; and
   the output serial port transfers the portion of the data as a serialized output stream.

6. The memory device of claim 4, wherein:
   the input serial port receives serialized data from a second memory device; and
   the output serial port transfers the serialized data as a serialized output stream.

7. The memory device of claim 1, further comprising:
   serial control circuitry to control operation from the normal mode of operation to the fault mode of operation.

8. The memory device of claim 1, embodied as a dynamic random access memory (DRAM) device.

9. The memory device of claim 1, further comprising:
   interface selection circuitry to select the primary interface to access the memory core circuitry during the normal mode of operation, and to select the secondary interface to access the memory core circuitry during the fault mode of operation.

10. The memory device of claim 1, wherein:
    the primary interface includes a parallel interface for coupling to a parallel bus.

11. An integrated circuit (IC) dynamic random access memory (DRAM) device, comprising:
    memory core circuitry to store data;
    a parallel interface including a data interface for coupling to multiple data paths and a command/address (C/A) interface for coupling to a command/address path, the parallel interface to provide access to the data stored in the memory core circuitry during a normal mode of operation; and
    a serial interface that is independent from the parallel interface, the serial interface to selectively provide access to the data stored in the memory core circuitry during a fault mode of operation.

12. The IC DRAM device of claim 11, wherein the serial interface further comprises:
    an input serial port; and
    an output serial port.

13. The IC DRAM device of claim 12, wherein:
    the input serial port receives an access request to access a portion of the data in the memory core circuitry; and
    the output serial port transfers the portion of the data as a serialized output stream.

14. The IC DRAM device of claim 12, wherein:
    the input serial port receives serialized data from a second memory device; and
    the output serial port transfers the serialized data as a serialized output stream.

15. The IC DRAM device of claim 11, further comprising:
serial control circuitry to control operation from the normal mode of operation to the fault mode of operation.

16. The IC DRAM device of claim 11, further comprising:
interface selection circuitry to select the parallel interface to access the memory core circuitry during the normal mode of operation, and to select the serial interface to access the memory core circuitry during the fault mode of operation.

17. A method of operating an integrated circuit (IC) memory device, comprising
providing access, via a parallel interface, to data stored in memory core circuitry during a normal mode of operation, the parallel interface including a data interface for coupling to multiple data paths and a command/address (C/A) interface for coupling to a command/address path; and
selectively providing access, via a serial interface, to the data stored in the memory core circuitry during a fault mode of operation, the serial interface being independent from the parallel interface.

18. The method of claim 17, wherein the selectively providing access further comprises:
receiving an access command via the serial interface to retrieve the data stored in the memory core circuitry; and
transferring the accessed data off-chip.

19. The method of claim 17, wherein the selectively providing access further comprises:
receiving, via an input port of the serial interface, second data from a different memory device; and
transferring the second data off-chip via an output port of the serial interface.

20. The method of claim 17, wherein:
the providing access, via the parallel interface, to the data stored in the memory core circuitry is carried out in compliance with a dynamic random access memory (DRAM) protocol.

\* \* \* \* \*